United States Patent [19]

Stucky

[11] 4,109,811
[45] Aug. 29, 1978

[54] TRAILER WITH LOWERABLE BED

[76] Inventor: James L. Stucky, P.O. Box 673, Moundridge, Kans. 67107

[21] Appl. No.: 773,152

[22] Filed: Mar. 1, 1977

[51] Int. Cl.² .............................................. B62D 21/14
[52] U.S. Cl. .................................... 214/506; 280/686; 214/85; 280/43.11
[58] Field of Search .................. 214/505, 506, 85, 512; 280/680, 686, 43.11; 296/10, 14, 26

[56] References Cited

U.S. PATENT DOCUMENTS

| 2,321,864 | 6/1943 | Schoenrock | 280/686 |
| 3,135,401 | 6/1964 | Schramm | 214/512 X |
| 3,199,892 | 8/1965 | Boys | 280/68 X |
| 3,497,232 | 2/1970 | Richey | 214/506 X |
| 3,910,436 | 10/1975 | Machan | 214/506 |

FOREIGN PATENT DOCUMENTS 883,925  4/1943  France ....................... 296/10

Primary Examiner—Albert J. Makay
Attorney, Agent, or Firm—Clarence A. O'Brien; Harvey B. Jacobson

[57] ABSTRACT

A farm implement carrier is provided including an elongated load bed having front and rear ends. The front end of the load bed includes structure for hitching to a draft vehicle and a rear frame section is provided including a pair of opposite side elongated longitudinal members. Wheeled transverse axle structure is supported beneath the frame and supports the latter intermediate the opposite ends of the longitudinal members. The rear end of the load bed includes follower structure guidingly engaged and supported from the longitudinal members of the frame for shifting therealong from the front ends thereof, when the latter are inclined downwardly for engagement with the ground, to the rear ends thereof behind the axle structure or assembly and the fulcrum defined thereby, whereby to over-balance the rear ends of the longitudinal members and cause the front ends thereof to swing upwardly into engagement with the under-side portions of the opposite sides of the load bed.

4 Claims, 9 Drawing Figures

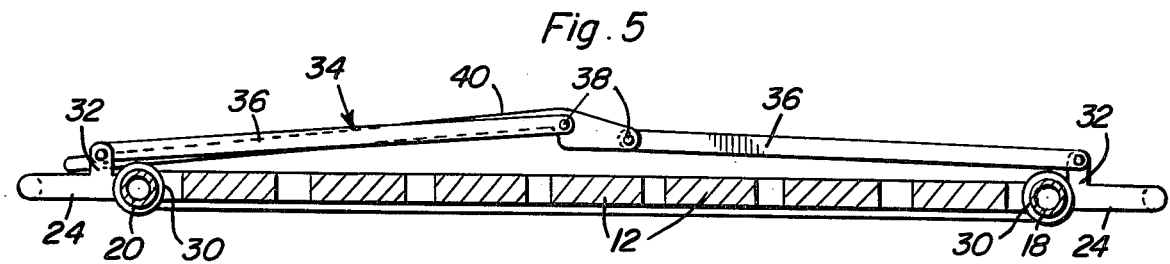
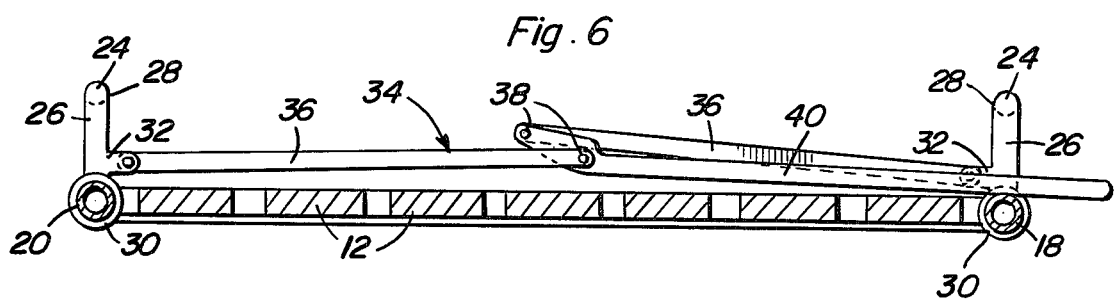
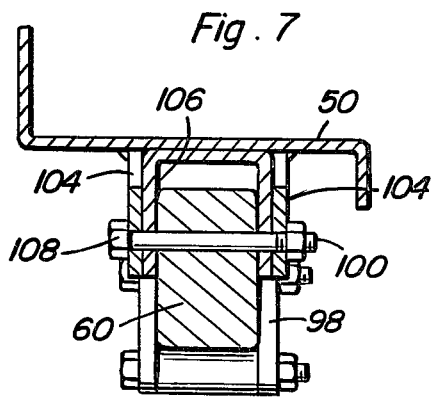
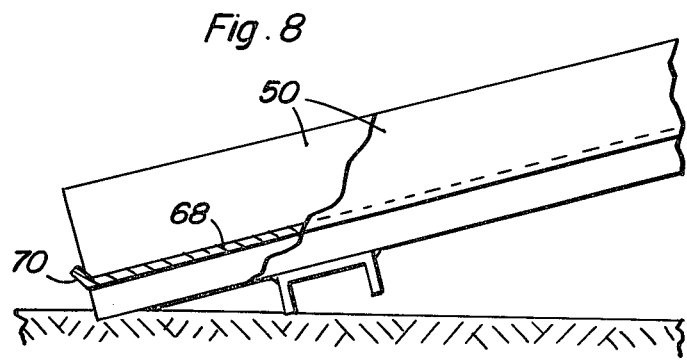
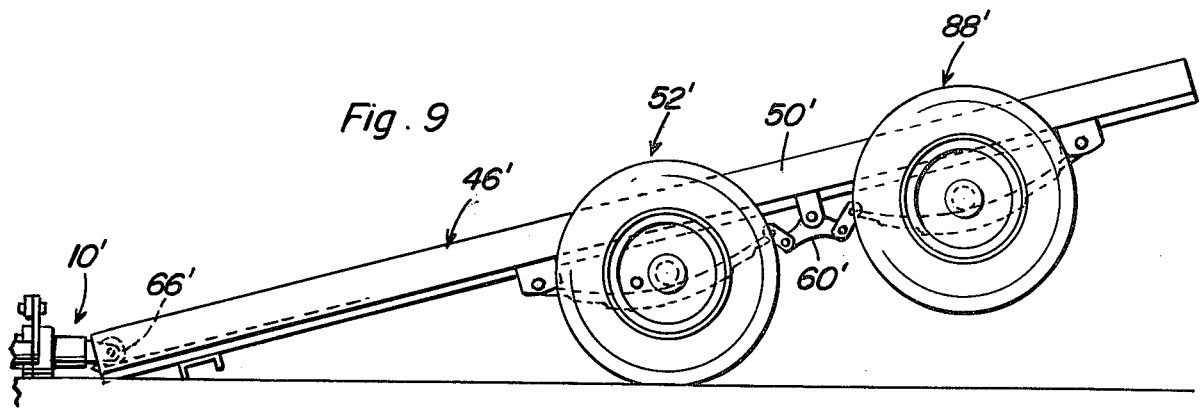

TRAILER WITH LOWERABLE BED

BACKGROUND OF THE INVENTION

Various forms of trailer-type carriers and vehicles including lowerable load beds have been heretofore provided such as those disclosed in U.S. Pat. Nos. 2,789,714, 2,803,362, 2,923,425, 3,179,271, 3,240,506, 3,335,887.

However, these previously known load carrying structures have not included the most simplified structure possible with spring mounted running gear whereby heavy farm implements may be readily transported over relatively rough terrain without excessive ground shocks being transmitted to the carrier or the load supported therefrom. The above mentioned U.S. Pat. No. 3,179,271 includes many of the general structural features of the instant invention, but does not include spring mounted running gear nor outwardly and downwardly retractable upstanding sides for retaining a load on the carrier against transverse displacement therefrom.

BRIEF DESCRIPTION OF THE INVENTION

The load carrier of the instant invention has been specifically designed as a farm implement carrier, although it may also be utilized for other purposes such as carrying a multiplicity of lengths of irrigation pipe.

The carrier is herein disclosed in two forms and each disclosed form includes spring mounted running gear and outwardly and downwardly retractable sides.

The main object of this invention is to provide a heavy load capacity carrier of the trailer type equipped with a low height load bed and constructed in a manner whereby the load bed may be readily longitudinally displaced relative to the running gear of the trailer into a position lying in substantially full contact with the ground for loading of the load bed.

Another object of this invention is to provide a carrier assembly constructed in a manner whereby the ground supported load bed thereof may be readily longitudinally shifted relative to the running gear in a manner so as to automatically elevate the rear end of the load bed to a position supported from the running gear.

Still another object of this invention is to provide a carrier in accordance with the preceding objects and including outwardly and downwardly retractable sides, whereby the load bed may be utilized to carry a plurality of irrigation pipe sections without those pipe sections shifting off the longitudinal sides of the load bed.

A final object of this invention to be specifically enumerated herein is to provide a low silhouette trailer-type carrier in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged transverse vertical sectional view of the load bed of the implement carrier with the longitudinal sides thereof in outwardly and downwardly retracted positions;

FIG. 6 is a transverse vertical sectional view similar to FIG. 5 but with the sides in upstanding operative positions;

FIG. 7 is an enlarged fragmentary transverse vertical sectional view taken substantially upon the plane indicated by the section line 7—7 of FIG. 4;

FIG. 8 is an enlarged fragmentary side elevational view of the forward end of the running gear assembly illustrated in position resting upon the ground and with portions of the near side longitudinal member of the running gear frame broken away and illustrated in vertical section; and FIG. 9 is a fragmentary side elevational view similar to FIG. 2 but of a modified form of implement carrier.

DESCRIPTION OF THE PREFERRED EMBODIMENTS

Figure 1:
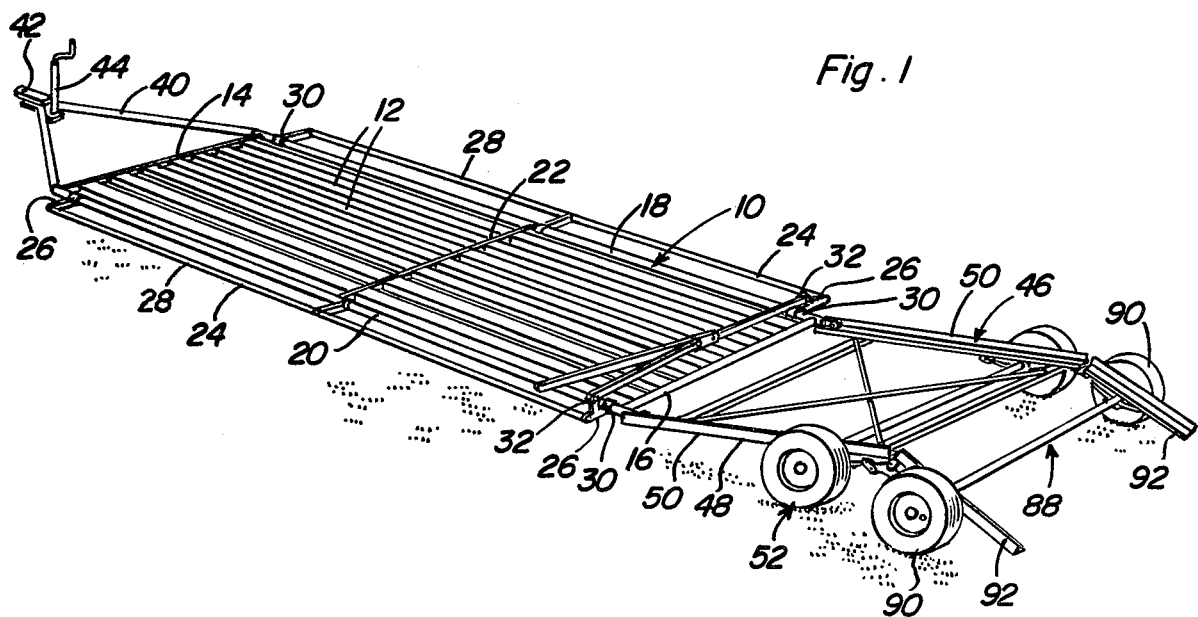
FIG. 1 is a perspective view of the implement carrier of the instant invention with the load bed thereof in a forwardly displaced position relative to the running gear and lying upon the ground upon which the running gear rests.

Referring now more specifically to the drawings, the numeral 10 generally designates the implement carrier of the instant invention. The carrier 10 includes a plurality of laterally spaced elongated load bed defining members 12 interconnected at their opposite ends by means of front and rear transverse members 14 and 16. The load bed comprising the members 12, 14 and 16 also includes a pair of opposite side longitudinal cylindrical members 18 and 20 between which the transverse members 14 and 16 are secured and the intermediate portions of the members 12, 18 and 20 are interconnected by means of transverse bracing structure 22.

A pair of opposite side U-shaped frames 24 each including a pair of short legs 26 interconnected at one pair of corresponding ends by means of a bight portion 28 extending longitudinally of the carrier 10 are provided. The ends of the legs 26 remote from the bight portions 28 include sleeves 30 rotatably received on the corresponding ends of the members 18 and 20 and each of the rear legs 26 includes a lever arm 32 projecting outwardly therefrom. A toggle linkage assembly referred to in general by the reference numeral 34 is provided and includes a pair of links 36 having one pair of corresponding ends pivotally connected to the levers or lever arms 32 and the other pair of corresponding ends pivotally connected as at 38 to longitudinally spaced portions of an operating lever 40. With attention invited more specifically to FIGS. 5 and 6 of the drawings, it may be seen that when the operating lever 40 is swung to the left the frames 24 are swung outwardly and downwardly into positions substantially coplanar with the load bed defined by the members 12, 18 and 20. However, when the lever 40 is swung from the left to the right as illustrated in FIG. 6 of the drawings the frames 24 are pulled upwardly and inwardly toward upstanding positions defining upstanding sides for the load bed.

Figure 2:
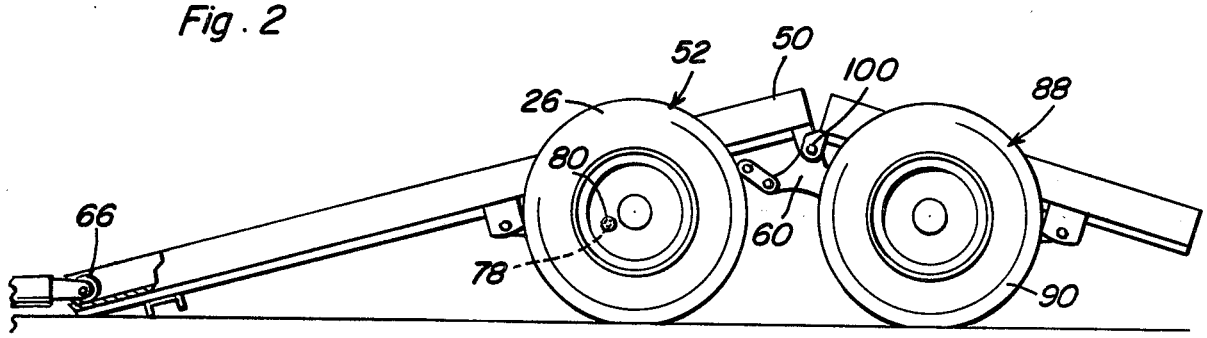
FIG. 2 is a fragmentary side elevational view of the rear end portion of the assemblage illustrated in FIG. 1.

The forward end of the load bed includes a forwardly projecting towing tongue 40 equipped with a tow hitch coupling 42 and a screw jack structure 44. In addition to the load bed the implement carrier 10 includes a running gear assembly referred to in general by the reference numeral 46 consisting of a frame 48 having a pair of suitably transversely braced opposite side longitudinal members 50. A front axle assembly referred to in general by the reference numeral 52 underlies the rear portion of the frame 48 and is supported therefrom at its opposite ends by means of a pair of leaf springs 54. The leaf springs 54 extend longitudinally of the frame 48 and have their forward ends pivotally supported from the longitudinal members 50 by means of mounting brackets 56. The rear ends of the longitudinal members 50 include depending brackets 58 to which equalizing links 60 are pivotally connected intermediate their opposite ends. The front ends of the links 60 are connected, by pivotally supported shackles 62 to the rear ends of the springs 54 and it may be seen from FIG. 2 of the drawings that the rear ends of the other members 18 and 20 include wheeled followers 66 rollingly engaged with the longitudinal members 50 for guided movement therealong, the members 50 each including a horizontal longitudinally extending flange portion 68 along which the corresponding wheeled follower 66 may be rolled. The forward ends of the flanges 68 include upturned portions 70 to prevent the wheeled followers 66 from rolling off the front end of the flanges 68. In addition, the axle assembly 52 includes opposite end plates 72 apertured as at 74 and the wheels 76 journaled from opposite ends of the axle assembly 52 include eccentrically located openings 78 formed therethrough registrable with the openings or apertures 74. When either pair of corresponding apertures 78 and 74 are registered, a removable locking pin 80 is passed therethrough to prevent that wheel 76 from turning. Accordingly, when the tongue 40 is operatively coupled to a draft vehicle such as a farm tractor 82, either one or both of the wheels 76 may be locked and the tractor 82 may be operated in reverse so as to rearwardly displace the load bed relative to the running gear assembly 46 from the ground supported position of the load bed illustrated in FIG. 1 through the intermediate position of the load bed illustrated in FIG. 4 and to the full transit position of the load bed illustrated in FIG. 3. As the wheeled followers 66 move upwardly along the flanges 68 and over the center of the axle assembly 52, the rear ends of the longitudinal members 50 of the frame 48 will be over-balanced so as to cause the longitudinal members 50 to pivot about the axle assembly 52 in order to swing the forward ends of the longitudinal members 50 up into abutting engagement with underside surface portions of the opposite sides of the load bed spaced forwardly of the rear end thereof. When the load bed has been rearwardly displaced relative to the running gear assembly 46 to the position thereof illustrated in FIG. 3, any suitable means (not shown) may be provided to lock the load bed against longitudinal displacement relative to the running gear assembly 46. Of course, it will be noted from FIG. 3 of the drawings that when the load bed is rearwardly displaced to the transport position thereof illustrated in FIG. 3 the wheeled followers 66 are displaced rearwardly of the running gear assembly 46.

In addition to the running gear assembly 46, a second rear axle assembly referred to in general by the reference numeral 88 is provided including wheels 90 journaled from its opposite ends. Also, the running gear assembly 88 includes opposite side longitudinal frame members 92 from which the axle assembly 88 is supported by means of a second pair of leaf springs 94. The rear ends of the members 92 include mounting brackets 96 from which the rear ends of the springs 94 are pivotally supported and the front ends of the springs 94 are pivotally connected to the rear ends of the corresponding levers 60 by means of shackles 98 corresponding to the shackles 62. Also, the front ends of the longitudinal members 92 are pivotally supported from the rear ends of the longitudinal members 50 as at 100.

From FIG. 7 of the drawings it may be seen that the longitudinal members 92 include forward end depending mounting flanges 104 and that the rear ends of the longitudinal members 50 include depending U-shaped mounting brackets 106 received between the corresponding flanges 104 and that the pivotal connection as at 100 is defined by a pivot bolt 108 secured through the legs of the bracket 106, the depending flanges 104 and the upper central portion of the lever 60.

Figure 3:
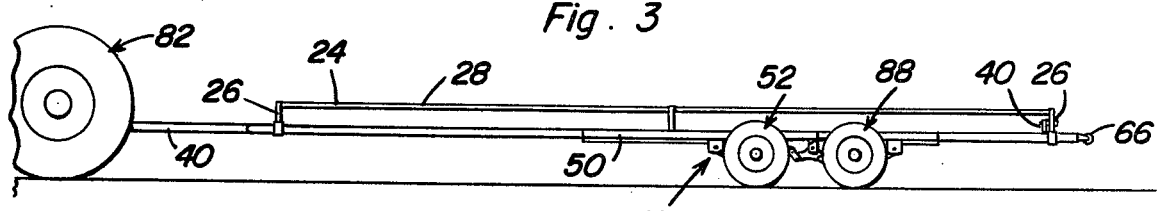
FIG. 3 is a side elevational view of the implement carrier in a transport position.
Figure 4:
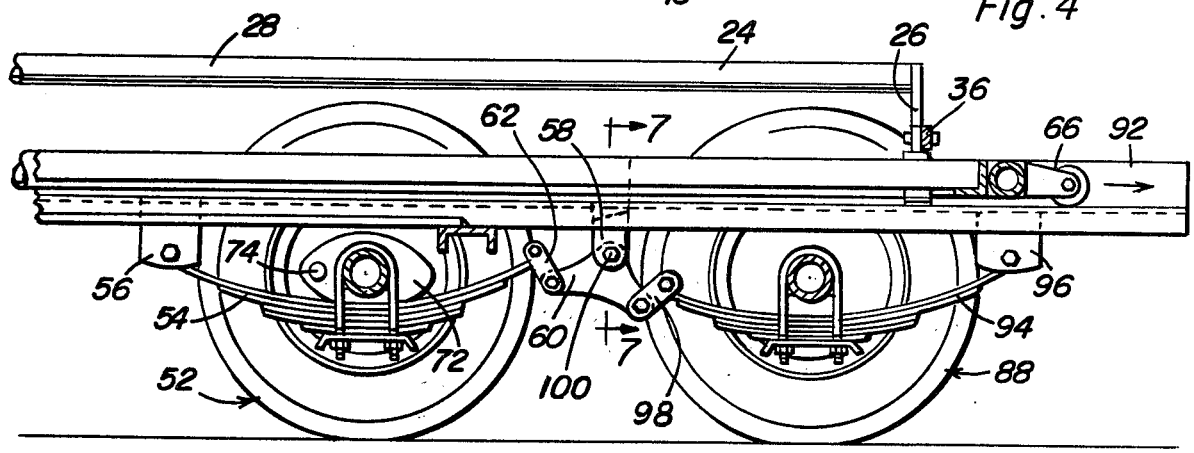
FIG. 4 is an enlarged fragmentary longitudinal vertical sectional view taken substantially upon a plane passing through the rear running gear of the implement carrier and with the load bed of the carrier illustrated in position being rearwardly shifted to a full transport position relative to the running gear.

In operation, when it is desired to load the carrier 10, the load bed thereof is released from the full transit position illustrated in FIG. 3 and one or both of the wheels 76 is locked in the aforementioned manner. Then, the tractor 82 is driven forwardly until such time as the wheeled followers 66 move sufficiently along the longitudinal members 50 to cause the forward ends of the latter to swing downwardly into engagement with the ground upon which the wheels 76 rest. Then, continued forward movement of the load bed results in the latter being lowered to the ground with the wheeled followers 66 engaged with the upturned end portions 70 of the flanges 68. Then, the lever 36 may be swung to the left from the position thereof illustrated in FIG. 6 to the position thereof illustrated in FIG. 5 in order to lower the sides defined by the frames 24. Then, any implement desired to be carried on the carrier 10 is driven onto the load bed. On the other hand, if a plurality of irrigation pipe sections are to be carried, the pipe sections may be loaded onto the load bed. Thereafter, the tractor 82 is operated in reverse in order to rearwardly displace the load bed to the position thereof illustrated in FIG. 3 of the drawings, in which position the load bed will be locked by any suitable means (not shown). Of course, as the load bed 66 is being rearwardly displaced upwardly along the longitudinal members 50 and the wheeled followers 66 pass rearwardly of the axle assembly 52, the rear ends of the longitudinal members 50 will be over-balanced causing the latter to swing to the horizontal positions thereof illustrated in FIG. 3, which displacement of the longitudinal members 50 also causes the longitudinal members 92 to swing from the positions thereof illustrated in FIG. 1 to the positions illustrated in FIG. 3.

Of course, when it is desired to unload the carrier 10 the process is repeated.

With attention now invited more specifically to FIG. 9 of the drawings, there will be seen a modified form of carrier referred to in general by the reference numeral 10. The carrier 10' includes many of the structural features of the carrier 10 and differs from the latter only in that the longitudinal members 92 of the carrier 10 are formed integrally and rigid with the equivalent of the longitudinal members 50 of the carrier 10. Accordingly, the running gear assembly 46' of the carrier 10' includes one piece opposite side longitudinal members 50' from which both of the axle assemblies 52' and 88' are supported.

From FIG. 9 of the drawings it may be seen that the loading and unloading of the carrier 10' is carried out in substantially the same manner as the loading and unloading of the carrier 10 is accomplished. However, when the forward ends of the longitudinal members 50' are inclined downwardly into engagement with the ground the entire rear axle assembly 88 is swung upwardly from engagement with the ground. Thus, the running gear assembly 46 includes an articulated frame whereas the running gear assembly 46' includes a rigid frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A farm implement carrier comprising an elongated load bed having front and rear ends, the front end of said load bed including means for hitching to a draft vehicle, a rear frame section including a pair of opposite side elongated longitudinal members, wheeled transverse axle means supported beneath said frame and supporting the latter intermediate the opposite ends of said longitudinal members, the rear end of said load bed including follower means guidingly engaged with and supported from said longitudinal members for shifting therealong from the front ends thereof, when the latter are inclined downwardly for engagement with the ground, to the rear ends thereof behind said axle means and the fulcrum defined thereby, whereby to over-balance the rear ends of said longitudinal members and cause the front ends thereof to swing upwardly into engagement with the opposite sides of said load bed, said opposite side elongated longitudinal members each including an elongated rearwardly projecting extension pivotally mounted from the rear end thereof for oscillation between a rearwardly and downwardly inclined position and a generally horizontal position at least substantially longitudinally aligned with the corresponding longitudinal member, a transverse axle member having wheels jounaled from its opposite ends extending between and supported from said extensions, said follower means being guidingly engageable with, shiftable rearwardly along and displaceable rearwardly off the rear ends of said extensions.

2. The combination of claim 1 wherein said axle means comprises an axle assembly having opposite end wheels, and means operative to releasably lock at least one of said wheels against rotation.

3. The combination of claim 1 including a pair of opposite side front-to-rear extending levers having their mid-portions pivotally supported from said members and the corresponding extensions for oscillation about axes coinciding with the axes of oscillation of said extensions relative to said longitudinal members, the rear and front ends of the front and rear springs being pivotally connected to the front and rear ends of the corresponding levers.

4. The combination of claim 3 wherein said axle means comprises an axle assembly having opposite end wheels, and means operative to releasably lock at least one of said wheels against rotation.

* * * * *